United States Patent [19]

Bruno, Jr. et al.

[11] Patent Number: 4,791,732
[45] Date of Patent: Dec. 20, 1988

[54] ADJUSTABLE MARKING GAUGE

[76] Inventors: Jack A. Bruno, Jr., 866 Trailwood Dr., Boardman, Ohio 44512; Frank J. Popovich, 9100 N. Lima Rd., Poland, Ohio 44514

[21] Appl. No.: 76,746

[22] Filed: Jul. 23, 1987

[51] Int. Cl.⁴ .............................................. B23B 49/02
[52] U.S. Cl. ........................................ 33/578; 33/667; 33/669
[58] Field of Search ............... 33/574, 578, 667, 666, 33/42, 43, 44, 452, 464, 669

[56] References Cited

U.S. PATENT DOCUMENTS

| | | | |
|---|---|---|---|
| 826,425 | 7/1906 | Heatcote | 33/452 |
| 1,545,424 | 7/1925 | Heimrich | 33/574 |
| 2,197,505 | 4/1940 | Mosher | 33/452 X |
| 2,203,992 | 6/1940 | Lutz | 33/667 |
| 2,582,606 | 1/1952 | Riddle | 33/667 |
| 2,807,095 | 9/1957 | Maxwell | 33/667 |
| 4,257,166 | 3/1981 | Barker et al. | 33/667 X |

Primary Examiner—William D. Martin, Jr.
Attorney, Agent, or Firm—Wayne D. Porter, Jr.

[57] ABSTRACT

An adjustable marking gauge provides an x-y adjustment capability especially adapted to enable conventional drawer and cabinet hardware to be conveniently mounted. The marking gauge includes a body portion in the form of a rectangular block from which an adjustable slide arm projects. The slide arm has a J-shaped end portion and markings which enable distances from the midpoint of the block to be measured easily. An adjustable slide bar is connected to the block and is movable perpendicular relative to the slide arm. The slide bar includes preformed openings corresponding to the dimensions of conventional drawer and cabinet hardware.

17 Claims, 2 Drawing Sheets

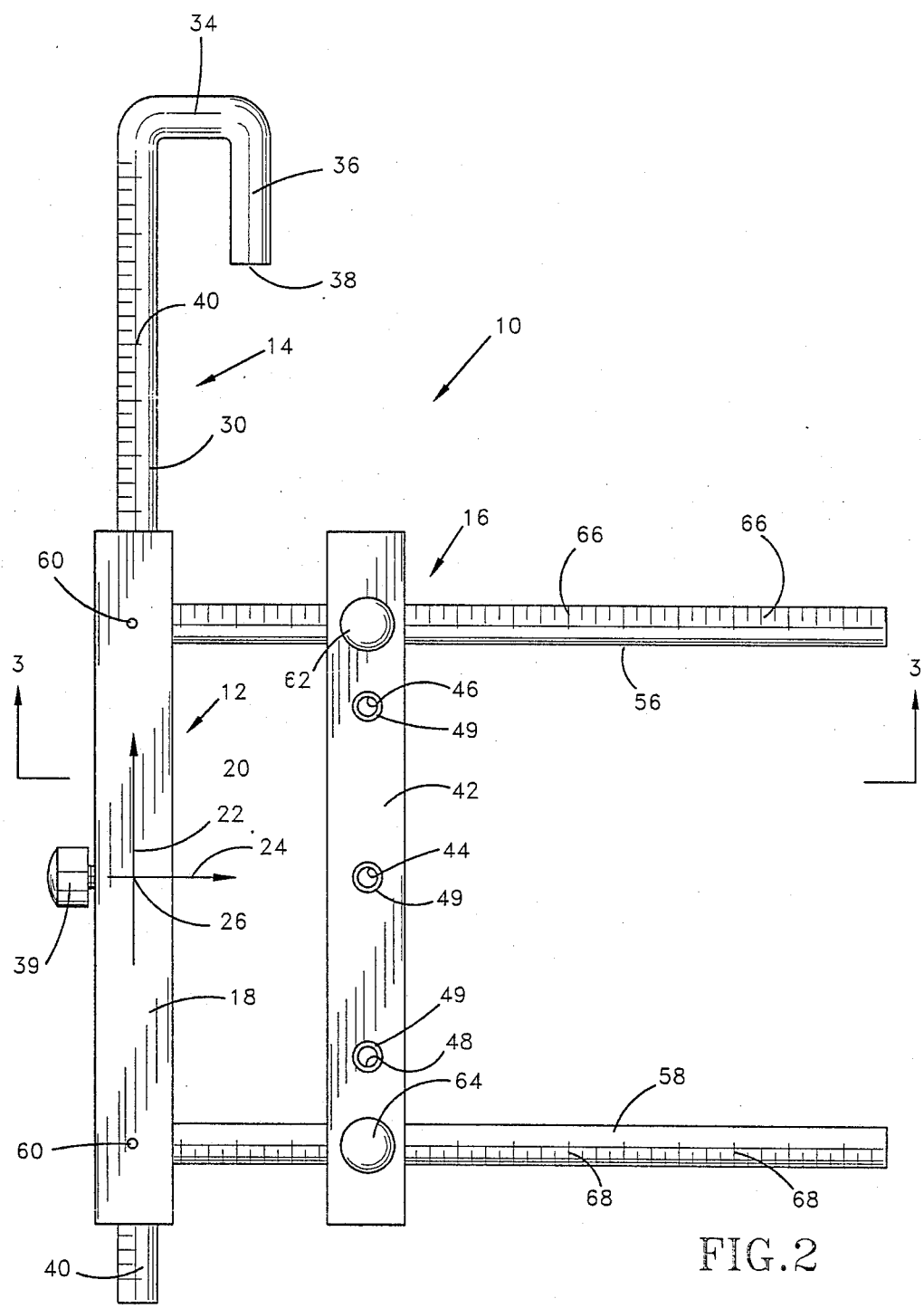
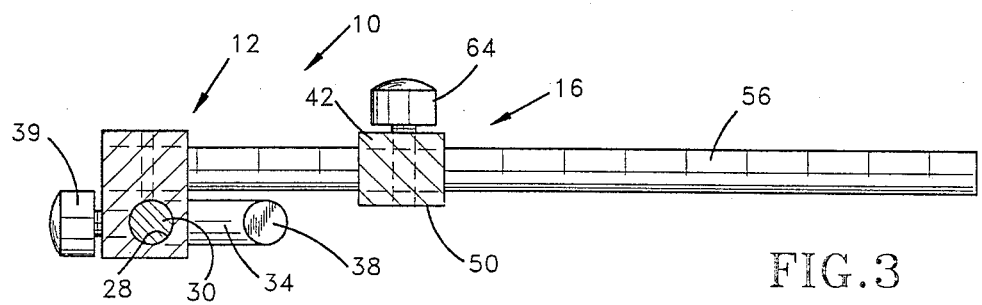
FIG.2
FIG.3

ADJUSTABLE MARKING GAUGE

BACKGROUND OF THE INVENTION

1. Field of the Invention

The invention relates to adjustable marking gauges and, more particularly, to a marking gauge especially adapted for use in installing drawer and cabinet hardware.

2. Description of the Prior Art

During the installation of drawers and cabinets, (hereinafter "workpieces"), it usually is necessary to drill openings in the workpieces in order for hardware such as drawer pulls to be connected to the workpieces. This is because openings often are not formed in the workpieces at the factory. Unfortunately, it is time consuming and difficult for openings to be formed accurately during installation because a number of measurements are required for each workpiece, and the measurements cannot always be made conveniently. Typically, the centerline of each workpiece must be determined (or a predetermined point off center must be determined). Markings then must be made on either side of the centerline, and additional markings then must be made inwardly from the edge of the workpiece. The process is time consuming and it can lead to inaccuracies.

A number of marking gauges are available that are adapted to mark particular kinds of workpieces so as to enable various operations to be performed on the workpieces. One such example is the patent to Lee, U.S. Pat. No. 2,536,378. Lee's marking gauge employs a runner through which a ruler can be moved. A marking unit is adjustably secured to one end of the ruler. The marking unit has a pair of pins projecting along one side, which pins are adjustable toward or away from each other by means of a screw. Because Lee's ruler slides in one direction relative to the runner, and because the marking unit also slides in that same direction, Lee's device does not provide a true x-y adjustment capability. In effect, Lee's device either moves the pins in one direction away from a point, or toward or away from each other. The result of using Lee's device is that the measuring gauge itself cannot determine the centerline or other predetermined point of the workpiece so as to properly space the pins on either side of that point. Accordingly, Lee's marking gauge does not completely and adequately address the problems confronting those who are installing drawer and cabinet hardware.

Another device of interest is that shown by Feddish in U.S. Pat. No. 3,296,702. Feddish discloses a framing square gauge consisting essentially of an elongate gauge assembly to which a conventional T-square can be fitted. An extensible gauge rod is secured to the opposite side of the gauge assembly from the T-square. The gauge rod includes a so-called stop portion which extends at right angles to the rod and which is adapted to be butted up against the end of a workpiece which is to be sawed. The gauge rod can be provided with markings in order to measure the length of the boards being sawed. Although Feddish's gauge rod represents a convenient technique for measuring distances from the end of the workpiece, it is not useful in measuring distances from the edge of the workpiece being sawed. The Feddish device does not disclose an x-y adjustment capability and, in any event, it is unsuitable for installing drawer and cabinet hardware.

In view of the foregoing drawbacks of the prior art, it is a desirable objective to have an adjustable marking gauge which provides a true x-y adjustment capability. It is another desirable objective that such a marking gauge is especially adapted to facilitate the installation of drawer and cabinet hardware.

SUMMARY OF THE INVENTION

The present invention overcomes the noted drawbacks of the prior art and provides a new and improved marking gauge having a true x-y adjustment capability. Although the invention is not so limited, it is especially effective in installing drawer and cabinet hardware.

The present invention includes (1) a body portion having a major axis and a minor axis, (2) a first measuring means for measuring distances along the major axis of the body portion, the first measuring means being connected to the body portion and slideable relative thereto along the major axis of the body portion, and (3) a second measuring means for measuring distances along the minor axis of the body portion, the second measuring means being connected to the body portion and slideable relative thereto along the minor axis of the body portion. In order to provide an x-y adjustment capability, the major and minor axes are perpendicular to each other.

In the preferred embodiment, the body portion is in the form of a rectangular block having a flat side adapted to engage a workpiece. The first measuring means is in the form of a slide arm extending from the block, the slide arm having markings therealong to determine how far the slide arm has been pulled from a predetermined point, preferably the midpoint of the block. Desirably, the end of the slide arm is J-shaped, and the markings are calibrated from the end of the reflexed portion of the J-shaped end.

The second measuring means is in the form of a rectangular bar having a flat side adapted to engage a workpiece. The bar includes openings through which ruled rods extend. The rods project from one side of the block and enable the bar to be moved relative to the block along the minor axis of the block. The rods are ruled to enable the user to determine how far the bar has been moved from a predetermined point, preferably the edge of the block closest to the bar. Preferably, the rods are stationary relative to the block and the bar is movable along the rods. The bar includes preformed openings extending perpendicular to the plane in which the bar moves. The openings enable the workpiece to be marked or drilled without any direct measurement of the workpiece being made.

As will be apparent, the present invention provides an exceedingly simple, reliable, and inexpensive technique for making x-y measurements on workpieces. In particular, by spacing the openings in the bar the same distance as openings found in conventional drawer and cabinet hardware, the invention will be especially useful for installing such hardware. These, and other features and advantages of the present invention, are described in more detail hereinafter.

DESCRIPTION OF THE DRAWINGS

FIG. 2 is a plan view of the marking gauge of FIG. 1 showing a slide arm in a reversed position; and FIG. 3 is a cross-sectional view of the marking gauge taken along a plane indicated by line 3—3 in FIG. 2.

DESCRIPTION OF THE PREFERRED EMBODIMENT

Figure 1:
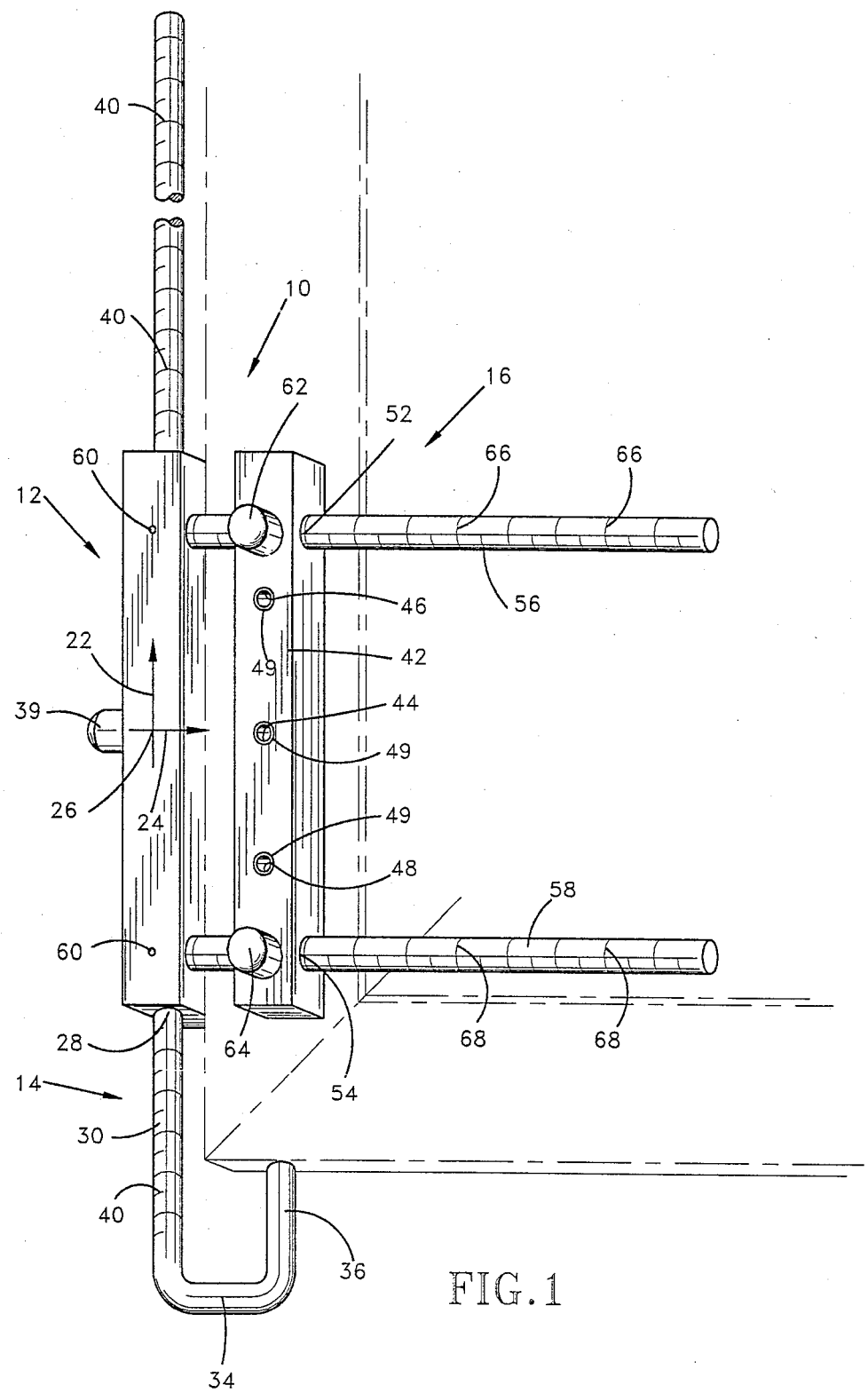
FIG. 1 is a perspective view of an adjustable marking gauge according to the invention as it might be positioned in use against a workpiece.

Referring to FIGS. 1-3, an adjustable marking gauge according to the invention is indicated generally by the reference numeral 10. The marking gauge 10 includes a body portion 12, a first measuring means 14, and a second measuring means 16.

The body portion 12 is in the form of a rectangular block 18 having flat sides. One of the sides is denominated by the reference numeral 20 and is adapted to engage a workpiece such as that indicated by the phantom lines in FIG. 1. The block 18 preferably is formed of aluminum or some other lightweight, dimensionally stable material. The block 18 has a major axis indicated by the reference numeral 22, and a minor axis indicated by the reference numeral 24. In order to provide a true x-y adjustment capability, the axes 22, 24 are perpendicular to each other. The midpoint of the block 18 is indicated by the reference numeral 26. Referring particularly to FIG. 3, a bore 28 extends through the block 18. The longitudinal axis of the bore 28 is parallel to the major axis 22.

The first measuring means 14 is in the form of an elongate slide arm 30 having a cross-section corresponding to that of the bore 28. The slide arm 30 is movable within the bore 28 along the major axis 22. One end 32 of the slide arm 30 is the same size and shape as the slide arm 30, thereby enabling the slide arm 30 to be inserted into, and removed from, the bore 28. The other end 34 of the slide arm 30 is J-shaped and includes a reflexed portion 36 having a flat end 38. A latching means 39 is provided for the slide arm 30 in order to permit the slide arm 30 to be maintained in a desired position relative to the block 18. The latching means 39 preferably is in the form of a thumb screw which can be easily tightened or loosened.

A plurality of markings 40 (measuring up to about 15 inches) are formed on the slide arm 30. The markings 40 are calibrated so as to indicate to the user the distance between the end 38 and the midpoint 26. Preferably the bore 28 is round so as to enable the slide arm 30 to be pivoted about its longitudinal axis. This feature of the first measuring means 14, coupled with the lateral spacing between the slide arm 30 and the end 38, enables the first measuring means 14 to be used with workpieces of almost any configuration.

The second measuring means 16 includes a rectangular bar 42 having openings 44, 46, 48 formed therein. The bar 42 preferably is made of the same material as the block 18. The openings 44, 46, 48 extend completely through the bar 42 and are disposed perpendicular to a plane in which the bar 42 moves. It is expected that the openings 44, 46, 48 will be defined by bushings 49 that will enable a power drill to be guided straight through the bar 42 without damaging it.

Referring particularly to FIG. 3, the bar 42 includes a flat surface 50 adapted to engage workpieces. As seen in FIG. 1, the bar 42 also includes spaced openings 52, 54 near its ends. A pair of stationary rods 56, 58 are connected to the block 18 and extend outwardly therefrom. The rods 56, 58 are held in place within the block 18 by means of press pins 60. The rods 56, 68 have a cross-sectional configuration conforming to that of the openings 52, 54, thereby enabling the bar 42 to be moved back and forth along the rods 56, 58. The rods 56, 58 are positioned relative to the block 18 and the slide arm 30 such that a straight line connecting the openings 44, 46, 48 will be disposed parallel to the major axis 22. Further, the rods 56, 58 are positioned relative to the block 18 such that the openings 44, 46, 48 move parallel to the minor axis 24, with the center opening 44 always being aligned with the midpoint 26.

Latching means 62, 64 are provided for the bar 42 in order to permit the bar 42 to be maintained in a desired position relative to the block 18. The latching means 62, 64 preferably are in the form of thumb screws which can be easily tightened or loosened. The rods 56, 58 are provided with markings 66, 68, respectively, measuring up to about seven inches. The markings 66, 68 are calibrated to enable the user to determine the distance from the midpoint of the openings 44, 46, 48 to the flat side 20. If the marking gauge 10 is to be used in installing drawer and cabinet hardware, the openings 46, 48 should be disposed equidistantly on either side of the opening 44. The total distance between the openings 46, 48 should be three inches because that is the distance openings must be spaced in order to install conventional drawer and cabinet hardware.

If drawer and cabinet hardware is to be installed, the marking gauge 10 is used as follows. First, the user determines where the centerline of the hardware is to be located relative to the drawers and cabinets. Then, the slide arm 30 is positioned relative to the block 18 such that the end 38 is indicated to be the desired distance from the midpoint 26. Because the slide arm 30 can be pivoted about its longitudinal axis, it will be convenient for the user to find a position on the workpieces that will provide an accurate and repeatable measurement. After the center point of the hardware has been located as described, the bar 42 is moved along the rods 56, 58 to locate the openings 44, 46, 48 a desired distance inwardly from the edge of the drawer or cabinet being measured. After the thumb screws 62, 64 have been tightened, the end 38 can be brought into contact with the side of the drawer or cabinet, the flat side 20 can be brought into contact with its edge, and thereafter the workpiece can be marked by inserting a marker of some type through the openings 44, 46, or 48. Alternatively, openings can be drilled directly in the workpiece simply by inserting a drill bit through the openings 44, 46 or 48.

It will be appreciated from the foregoing description that the present invention provides an exceedingly simple, reliable, and inexpensive technique for making x-y measurements on workpieces. The components needed to construct the invention can be manufactured relatively easily, and they should have an exceedingly long life.

Although the invention has been described in its preferred form with a certain degree of particularity, it will be understood that the various components of the invention and their arrangement can be modified within the true spirit and scope of the invention as hereinafter claimed. For example, and not by way of limitation, such a variation as fastening the bar 42 to the rods 56, 58 and making the rods 56, 58 movable relative to the block 18 is within the scope of the invention. It is intended that the patent shall cover, by suitable expression in the appended claims, whatever degree of patentable novelty exists in the invention disclosed.

What is claimed is:

1. An adjustable marking gauge especially adapted to determine where openings should be formed in workpieces, comprising:

a block having a bore therethrough, the bore defining a longitudinal axis;

a first measuring means for measuring distances along the longitudinal axis of the bore, the first measuring means being in the form of a slide arm having markings formed thereon, the markings indicating how far the slide arm is positioned from a predetermined point on the block, the slide arm being disposed within the bore for movement therethrough; and a second measuring means for measuring distances along an axis perpendicular to the longitudinal axis of the bore, the second measuring means being connected to the block and slideable relative thereto.

2. The marking gauge of claim 1, wherein the block has a flat side adapted to engage a workpiece.

3. The marking gauge of claim 1, wherein the predetermined point is the midpoint of the block.

4. The marking gauge of claim 1, wherein the slide arm has a J-shaped end, the reflexed portion of which is adapted to engage a workpiece, the markings on the slide arm being calibrated from the end of the reflexed portion.

5. The marking gauge of claim 1, wherein the bore is of a cross-sectional configuration that will permit the slide arm to be pivoted about its longitudinal axis.

6. The marking gauge of claim 1, wherein the second measuring means is in the form of a bar, the bar having a flat side adapted to engage a workpiece.

7. The marking gauge of claim 6, wherein the bar has openings formed therein through which the workpiece can be marked, the openings being disposed perpendicular to the plane in which the bar moves.

8. The marking gauge of claim 7, wherein the bar has a first opening aligned with the midpoint of the block, the bar further having second and third openings spaced equidistantly on either side of the first opening.

9. The marking gauge of claim 1, wherein the second measuring means includes:

rods connected to the block and extending perpendicular to the axis along which the first measuring means moves;

a bar having openings therein through which the rods extend; and markings on the rods to indicate how far the bar is positioned from a predetermined point on the block.

10. The marking gauge of claim 9, wherein the predetermined point is the side of the block closest to the bar.

11. The marking gauge of claim 9, wherein the rods are rigidly connected to the block and the bar is slideable along the rods.

12. The marking gauge of claim 11, further comprising latching means carried by the bar for engaging the rods so as to hold the bar in a desired position relative to the block.

13. The marking gauge of claim 12, wherein the latching means is in the form of thumb screws.

14. An adjustable marking gauge especially adapted to determine where openings should be formed in workpieces, comprising:

a rectangular block having a flat side adapted to engage a workpiece, the block having a bore therethrough, the bore defining a longitudinal axis;

a slide arm connected to and extending outwardly from the block, the slide arm adapted to be moved relative to the block along the longitudinal axis of the bore, the slide arm having an end portion adapted to engage the workpiece, the slide arm further having markings calibrated to indicate the distance of the end of the slide arm from the midpoint of the block;

a pair of rods connected to and extending outwardly of the block, the rods being spaced apart a predetermined distance and extending along axes parallel to the longitudinal axis of the bore, the rods having markings thereon to calibrate the distance from the edge of the block from which the rods project;

a bar having openings therein through which the rods extend, the bar being movable along the rods toward or away from the block, the bar having three openings formed therein, which openings are disposed perpendicular to the plane in which the bar moves, one of the openings being positioned at a point corresponding to the midpoint of the first block, and the second and third openings being disposed on either side of the first opening an equal distance therefrom; and latching means for securing the bar in a desired position relative to the block.

15. The marking gauge of claim 11, wherein the end of the slide arm is J-shaped, and the markings on the slide arm are calibrated from the end of the reflexed portion of the J-shaped end.

16. The marking gauge of claim 11, wherein the slide arm is connected to the block such that the slide arm can be pivoted about its longitudinal axis.

17. The marking gauge of claim 11, wherein the latching means is in the form of a pair of thumb screws, one thumb screw being provided to engage each rod.

* * * * *